(12) United States Patent
Dehu et al.

(10) Patent No.: US 7,946,106 B2
(45) Date of Patent: May 24, 2011

(54) DEVICE FOR ACTUATING MOBILE COWLS EQUIPPING A THRUST REVERSER

(75) Inventors: Michel Philippe Dehu, Tournefeuille (FR); Fabrice Henri Emile Metezeau, Montivilliers (FR); Pierre André Marcel Baudu, Criquetot l'Esneval (FR); Vincent Pierre Germain Le-Coq, La Riviere St Sauveur (FR)

(73) Assignee: Aircelle, Gonfreville l'orcher (FR)

( * ) Notice: Subject to any disclaimer, the term of this patent is extended or adjusted under 35 U.S.C. 154(b) by 963 days.

(21) Appl. No.: 11/882,669

(22) Filed: Aug. 3, 2007

(65) Prior Publication Data

US 2008/0168762 A1 Jul. 17, 2008

Related U.S. Application Data

(63) Continuation-in-part of application No. 11/579,259, filed as application No. PCT/FR2005/001422 on Jun. 9, 2005, now Pat. No. 7,562,520.

(30) Foreign Application Priority Data

Jun. 29, 2004 (FR) .................................. 04 07096

(51) Int. Cl.
 *F02K 3/02* (2006.01)
(52) U.S. Cl. ................................... 60/226.2; 244/110 B
(58) Field of Classification Search .................. 60/226.2, 60/230; 244/110 B
 See application file for complete search history.

(56) References Cited

U.S. PATENT DOCUMENTS

| 5,960,626 | A | 10/1999 | Baudu et al. |
| 6,167,694 | B1 * | 1/2001 | Davies ........................ 60/226.2 |
| 6,681,559 | B2 * | 1/2004 | Johnson ......................... 60/204 |
| 6,926,234 | B2 * | 8/2005 | Colotte et al. ............ 244/110 B |
| 7,513,101 | B2 * | 4/2009 | Eschborn et al. .............. 60/204 |
| 2002/0157376 | A1 | 10/2002 | Ahrendt |
| 2003/0066283 | A1 * | 4/2003 | Ahrendt ......................... 60/204 |
| 2004/0195432 | A1 * | 10/2004 | Christensen .................... 244/10 |

FOREIGN PATENT DOCUMENTS

| EP | 0 843 089 A1 | 5/1998 |
| WO | WO 02/088540 A1 | 11/2002 |

* cited by examiner

*Primary Examiner* — Michael Cuff
*Assistant Examiner* — Phutthiwat Wongwian
(74) *Attorney, Agent, or Firm* — Oliff & Berridge, PLC

(57) ABSTRACT

A device that is capable of actuating at least two cowls of a thrust reverser. The device includes for each cowl, (a) at least two actuators suitable for opening and closing the cowl, (b) at least one slave flexible transmission shaft establishing mechanical connection between the two actuators of the cowl and (c) at least one mechanical coupling device associated to the at least one slave flexible transmission shaft. The device is further comprised of one motor, and at least two master flexible transmission shafts, each master flexible transmission shaft establishing mechanical connection between the motor and one respective mechanical coupling device. Upon rotation of the electrical motor, the master flexible transmission shafts are actuated, which causes actuation of the mechanical coupling devices, which causes actuation of the slave flexible transmission shafts and thereby the extension or retraction of the actuators.

13 Claims, 3 Drawing Sheets

DEVICE FOR ACTUATING MOBILE COWLS EQUIPPING A THRUST REVERSER

This patent application is a Continuation in Part of U.S. patent application Ser. No. 11/579,259, which itself is a US national phase of PCT/FR05/01422.

The present invention relates to a device for actuating mobile cowls equipping a thrust reverser for a turbojet.

The role of a thrust inverter for the landing of an aircraft is to improve the braking capacity of an aircraft by redirecting at least a portion of the thrust generated by the turbojet toward the front. In this phase, the inverter obstructs the gas exhaust duct and directs the exhaust stream from the engine toward the front of the pod, thereby generating a counter-thrust which is added to the braking of the aircraft wheels.

The implementation means for achieving this reorientation of the stream vary depending on the type of reverser. However, in all cases, the structure of a reverser comprises movable cowls that can be moved between, on the one hand, a deployed position in which they open in the pod a passageway designed for the diverted stream, and, on the other hand, a retracted position in which they close this passageway. These movable cowls may also fulfill the function of diversion or simply activation of other diversion means.

In reversers with grilles, for example, the movable cowls slide along rails so that, by moving backwards during the opening phase, they reveal diversion blade grilles placed in the thickness of the pod. A system of link rods connects the cowls to blocking doors which deploy inside the exhaust channel and block the direct stream outlet. In reversers with doors, on the other hand, each movable cowl pivots in order to come and block the stream and divert it and is therefore active in this reorientation.

In a general manner, these movable cowls are actuated by hydraulic or pneumatic cylinders which require a network for the conveyance of a pressurized fluid. This pressurized fluid is conventionally obtained by tapping air from the turbojet in the case of a pneumatic system or by offtaking from the hydraulic circuit of the aircraft. However, such systems require considerable maintenance because the slightest leak in the hydraulic or pneumatic network may have damaging consequences both for the reverser and for the other parts of the pod. Furthermore, because of the reduced space available in the front frame of the reverser, the installation and protection of such a circuit are particularly awkward and bulky.

To alleviate the various disadvantages associated with pneumatic and hydraulic systems, thrust reverser manufacturers have sought to replace them and as much as possible fit their reversers with electromechanical actuators that are lighter and more reliable. Such a reverser is described in document EP 0 843 089.

One of the objects of the present invention is to provide a particularly reliable architecture for such electromechanical actuation means.

This object is obtained with a device for actuating at least two mobile cowls equipping a thrust reverser, said device comprising:
  for each cowl, at least two extreme actuators suitable for opening and closing said cowl,
  for each cowl, at least one slave flexible transmission shaft establishing mechanical connection between the two actuators of said cowl,
  for each cowl, at least one mechanical coupling device associated to said at least one slave flexible transmission shaft, and
  one motor, and
  at least two master flexible transmission shafts, each master flexible transmission shaft establishing mechanical connection between said electrical motor and one respective mechanical coupling device, wherein the rotation of said motor causes the actuation of said master flexible transmission shafts, which causes the actuation of said mechanical coupling devices, which causes the actuation of said slave flexible transmission shafts and thereby the extension or retraction of said actuators.

Since each mechanical coupling device is located between the two extreme actuators of each cowl, in case of failure of one of the actuators of a cowl, motion can still be transmitted to the other actuator.

Thus, there is very little probability that the cowls be blocked in an unwanted position.

According to another embodiment of the invention, said actuation device comprises:
  for each cowl, two extreme actuators and one central actuator,
  for each cowl, two slave flexible transmission shafts, each flexible transmission shaft establishing mechanical connection between said central actuator and one respective extreme actuator, and
  for each cowl, one mechanical coupling device associated to one of said two slave flexible transmission shafts.

Thus, in this embodiment, in case of failure of one of the actuators of a cowl, there remain two valid actuators: this embodiment provides for even more security than the previous embodiment.

According to an optional feature of the invention, said motor is an electrical motor.

According to an optional feature of the invention, said electrical motor is an automatically controlled synchronous motor: such a motor is particularly well suited to the actuation device according to the invention because it is capable of receiving a torque or speed instruction.

According to other optional features of the invention:
  said actuation device comprises means for limiting the speed of said cowls at the beginning of said opening phase: by limiting the speed in such a way, and more precisely until the cowls have gone past the sensitive components, the power of an impact will be limited to that which these sensitive components can sustain without it being necessary to oversize them so that they can withstand an impact occurring at high speed and high power;
  said speed limiting means comprise a control interface and means for counting the number of revolutions made by one of the master flexible transmission shafts connected to the electrical motor
  said counting means comprise a resolver or a sensor
  said actuators are ball screw actuators.

The implementation of the invention will be better understood with the aid of the detailed description that is set out below with reference to the appended drawing in which.

Before describing in detail an embodiment of the invention, it is important to specify that the method described is not limited to one particular type of reverser. Although illustrated by a reverser with grilles comprising movable cowls sliding along rails, it could be applied to reversers of different design, particularly with doors. Furthermore, the principle of speed limitation at the beginning of the opening of the movable cowls may be applied to any type of motor actuating movable cowls, an electric motor only being easier to control.

Figure 1:
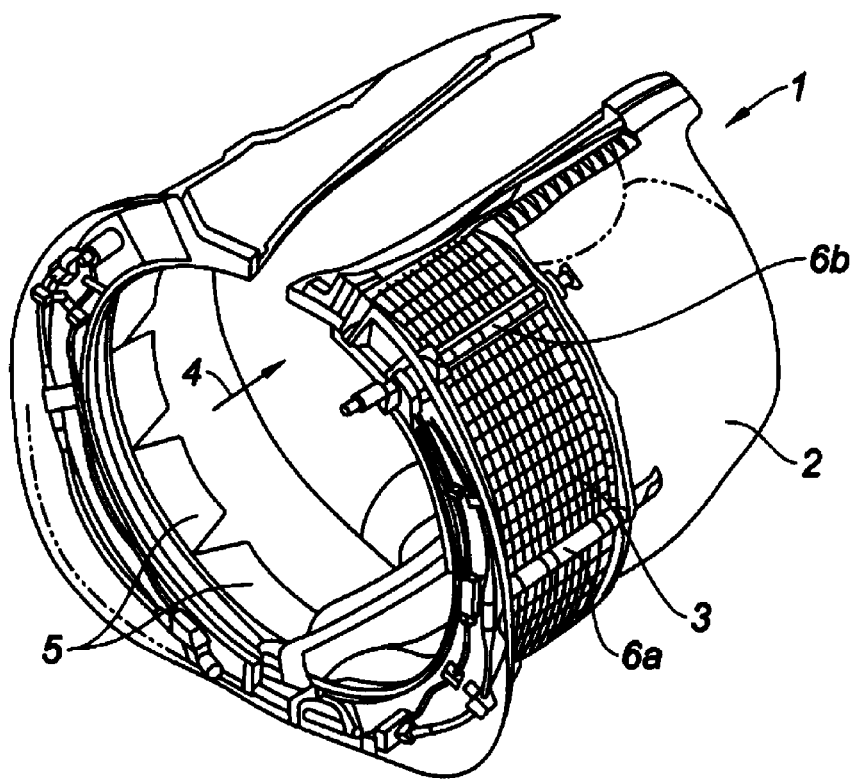
FIG. 1 is a partial schematic view in perspective of a pod incorporating a thrust reverser with grille.

FIG. 1 presents a partial schematic view of a pod incorporating a thrust reverser 1. The turbojet is not shown. This thrust reverser 1 has a structure comprising two semicircular movable cowls 2 capable of sliding along rails (not visible) to reveal diversion blade grilles 3 placed between the movable cowls 2 and a section of passageway of the air stream 4 to be diverted.

Blocking doors 5 are placed inside the structure so as to be able to pivot and move from a position in which they do not hamper the passage of the air stream 4 to a position in which they block this passage.

In order to coordinate the opening of the movable cowls 2 with a blocking position of the blocking doors 5, the latter are mechanically connected to the movable cowl 2 by hinges and to the fixed structure by a system of link rods (not shown).

The movable cowls 2 are moved on the rails along the outside of the structure by a set of actuators 6a, 6b mounted on a front frame inside which are housed an electric motor 7 and flexible transmission shafts respectively connected to the actuators 6a, 6b in order to actuate them.

The actuators 6a, 6b can be ball screw actuators, which are well known by the man skilled in the art.

Figure 2:
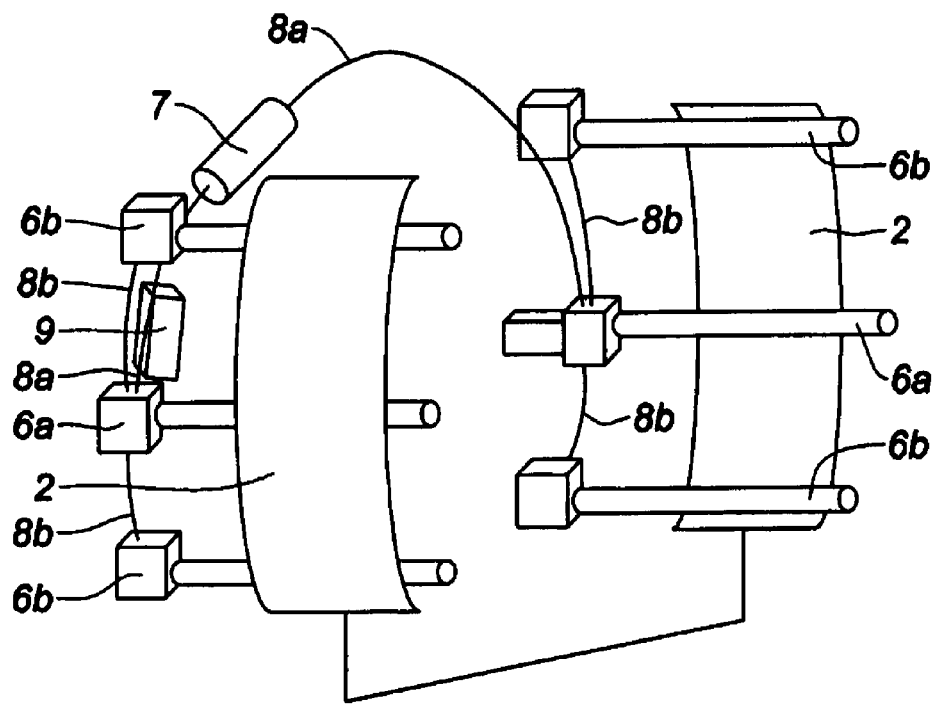
FIG. 2 is a schematic representation of the movable cowls and of their actuation system, according to a first embodiment of the invention.

The system for actuating the movable cowls 2 can be seen on FIG. 2. Each movable cowl 2 may be translated along its rails under the action of three actuators 6a, 6b, comprising a central actuator 6a and two extreme actuators 6b, actuated by a single electric motor 7 connected to a control interface 9.

The power delivered by the electric motor 7 is first of all delivered to the central cylinders 6a by means of two master flexible transmission shafts 8a, then to the additional cylinders 6b via slave flexible transmission shafts 8b.

Figure 2A:
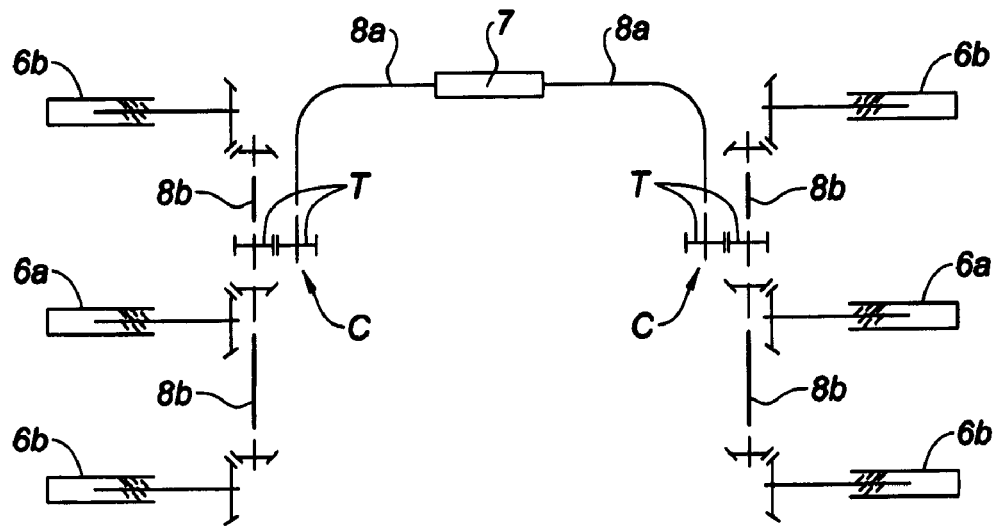
FIG. 2A is the cinematic diagram of the embodiment of FIG. 2.

The cinematic diagram of this embodiment can be seen on FIG. 2A: as can be seen on this figure, the mechanical coupling between the master flexible transmission shafts 8a and the slave flexible transmission shafts 8b can be obtained with mechanical coupling devices C.

These mechanical coupling devices can consist of toothed wheels T located either inside the central actuators 6a, or directly on one of the slave flexible transmission shaft 8b.

The rotation of motor 7 causes the actuation of the master flexible transmission shafts 8a, which causes the actuation of the mechanical coupling devices C, which causes the actuation of the slave flexible transmission shafts 8b and thereby the extension or retraction of the actuators 6a, 6b.

Since each mechanical coupling device C is located between the two extreme actuators 6b of each cowl, in case of failure of one of the actuators of a cowl, motion can still be transmitted to the other two actuators.

Figure 2B:
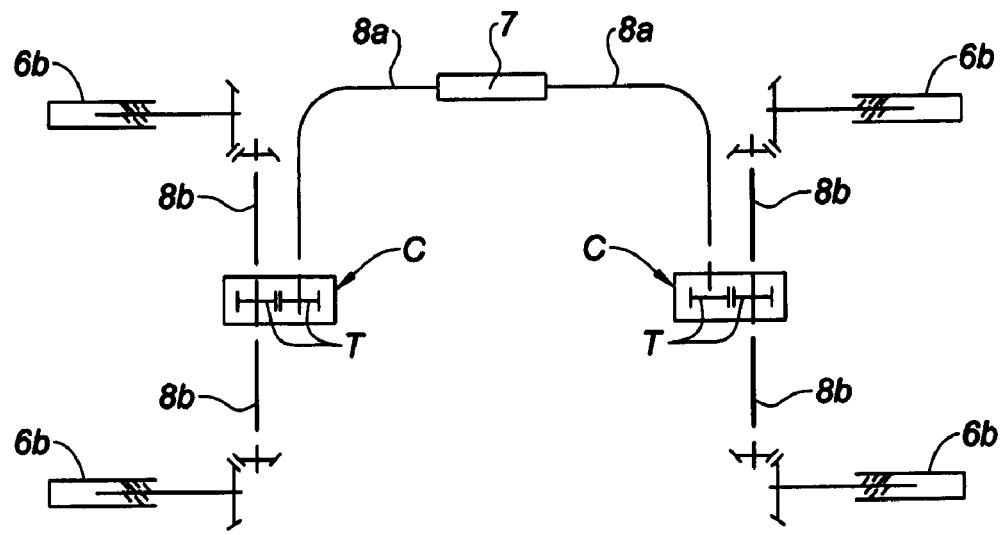
FIG. 2B is the cinematic diagram of another embodiment of the invention.

In the embodiment represented on FIG. 2B, there are only two actuators 6b for each cowl, the mechanical coupling device M being located between these two actuators.

An automatically controlled synchronous motor is an electric motor 7 particularly well suited to a method according to the invention because it is capable of receiving a torque or speed instruction. Its operation is based on the interaction between a rotor-related magnetic field and a rotating stator-related magnetic field. In such an electric motor 7, a sensor detects the exact position of the rotor and allows a frequency converter to maintain a 90° angle between the rotor and the stator-related rotating field so that the motor torque is always maximal. A modulation of the amplitude of the stator-related rotating field fixes the value of the motor torque. The sensor also gives information on the speed of rotation of the electric motor 7.

Controlling the delivered torque and the speed of rotation of such an electric motor 7 is simple. In order for the speed to remain constant in the case of the decrease or increase of load, the motor torque must be decreased or increased. The amplitude of the stator-related rotating field will therefore be reduced or increased but the frequency of the field will not be modified. For the torque to remain constant, the speed must be reduced while maintaining the amplitude of the stator-related field. A variator reduces the frequency of the stator-related field while retaining its amplitude.

Figure 3:
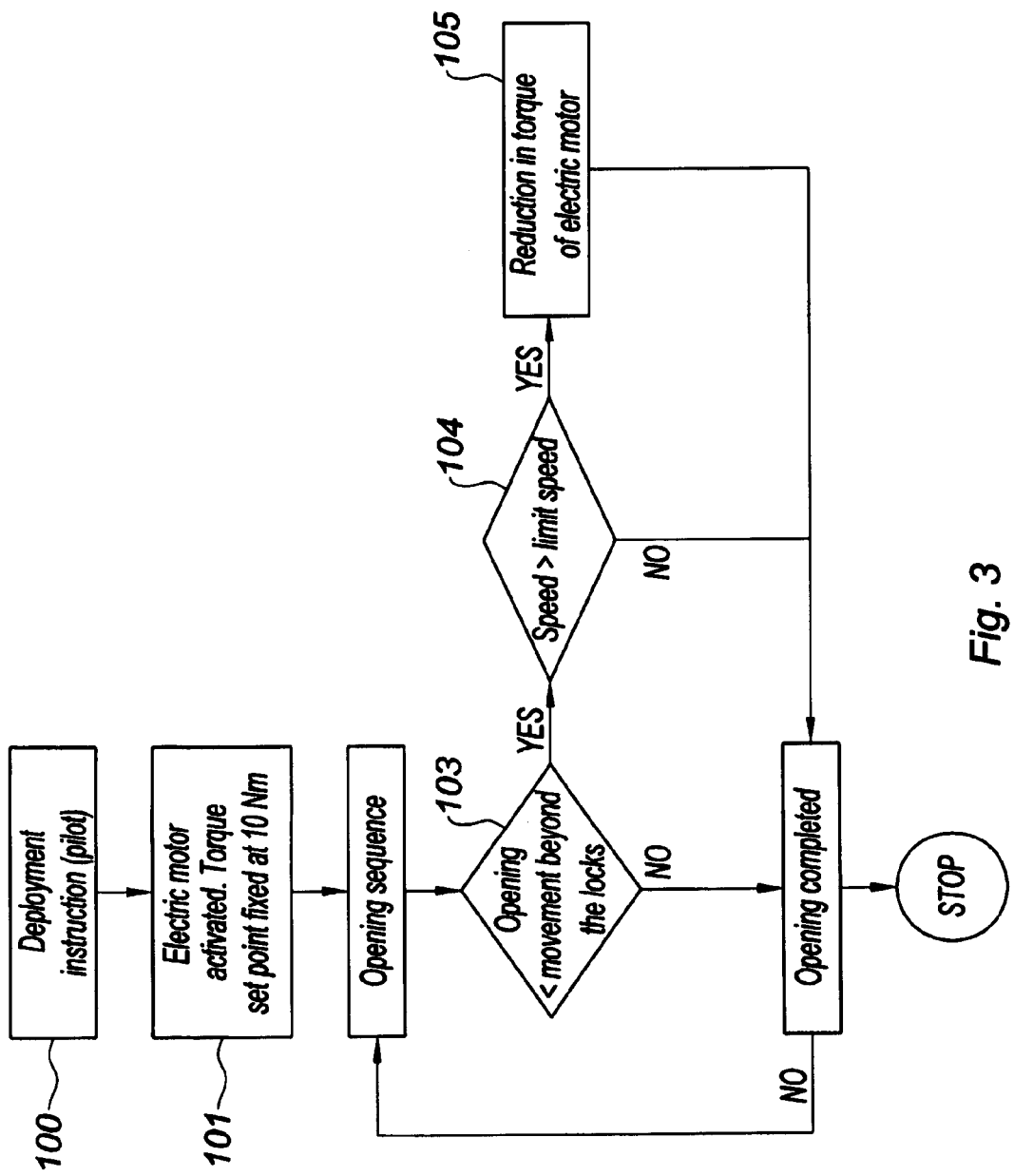
FIG. 3 is a diagram representing the operating steps of a method for controlling the actuating device according to the invention.

A diagram showing the steps of a method for controlling the actuation device according to the invention for the opening in normal conditions of the thrust reverser 1 is shown in FIG. 3.

Initially, the instruction 100 to deploy the reverser is given by the pilot. The electric motor 7 is activated during a step 101 which fixes therefore a torque set point equal to 10 Nm for example. Then follows a determined opening sequence causing the movable cowls 2 to open.

The sequence also comprises two test sub-steps 103, 104, forming a step for governing the electric motor 7, consisting in regularly analyzing respectively the movement of the movable cowl 2 then the speed of rotation of the electric motor 7.

If, during the test step 103, it appears that the movable cowl has not moved past the position of the locks, then the test step 104 is applied, otherwise the opening sequence continues normally until its end, when the movable cowl is fully open. Analyzing the movement of the movable cowls 2 therefore makes it possible to apply the speed limitation at the beginning of opening only. In practice, the movement of the movable cowls 2 is obtained by means of a resolver or a sensor terminating the flexible transmission shaft 8a and making it possible to count the number of revolutions made by the latter. However, other means are totally envisageable.

Following the test step 103, the test step 104 therefore analyzes the speed of rotation of the electric motor 7, representative of the speed of opening of the movable cowl 2. If the speed of rotation of the electric motor 7 is greater than the predetermined limit speed, then an instruction 105 fixes a lower torque set point for the electric motor 7. By reducing the torque delivered by the electric motor 7 while the loads to be overcome remain constant, the speed also reduces.

It is also possible to provide a sub-step consisting in testing whether the speed of rotation is lower than the predetermined limit speed so as to obtain a regulation of the speed keeping the latter as close as possible to the limit value, thereby preventing too great a limitation of the speed causing an unnecessary waste of time.

Once this test step 104 is completed and where necessary a new torque set point has been fixed, the method resumes the opening sequence until its end.

Although the invention has been described in connection with particular exemplary embodiments, it is clearly evident that it is in no way limited and that it includes all the technical equivalents of the means described and their combinations if the latter enter into the context of the invention.

The invention claimed is:

1. A device for actuating at least two cowls equipping a thrust reverser, comprising:
    for each of the cowls, at least two actuators that are capable of opening and closing the cowl, for each of the cowls, at least one slave flexible transmission shaft establishing a mechanical connection between the at least two actuators of the cowl, for each of the cowls, at least one mechanical coupling device to connected to at least one slave flexible transmission shaft, a single motor, and at least two master flexible transmission shafts, each master flexible transmission shaft establishing a mechanical connection between the single motor and each of the least two cowls by one of the least one mechanical coupling device, wherein the single motor is directly connected to the at least two master flexible transmission shafts, wherein rotation of the single motor causes actuation of the master flexible transmission shafts, which causes actuation of the mechanical coupling devices, which causes actuation the slave flexible transmission shafts and thereby extends or retracts the actuators.

2. A device according to claim 1, comprising:

for each of the cowls, the at least two actuators include two extreme actuators and one central actuator, for each of the cowls, two slave flexible transmission shafts, each flexible transmission shaft establishing a mechanical connection between the central actuator and one respective extreme actuator of the two extreme actuators, and for each of the cowls, one mechanical coupling device connected to one of the two slave flexible transmission shafts.

3. A device according to claim 1, wherein the single motor is an electrical motor.

4. A device according to claim 3, wherein the electrical motor is an automatically controlled synchronous motor.

5. A device according to claim 1, further comprising a device for limiting a speed of the cowls at a beginning of the opening of the cowl.

6. A device according to claim 5, wherein the speed limiting device comprises a control interface and a counting device to count a number of revolutions made by one of the master flexible transmission shafts.

7. A device according to claim 6, wherein the counting device comprises a resolver or a sensor.

8. A device according to claim 1, wherein the at least two actuators are ball screw actuators.

9. A device according to claim 2, wherein the single motor is an electrical motor.

10. A device according to claim 2, further comprising a device for limiting a speed of the cowls at a beginning of the opening of the cowl.

11. A device according to claim 3, further comprising a device for limiting a speed of the cowls at a beginning of the opening of the cowl.

12. A device according to claim 4, further comprising a device for limiting a speed of the cowls at a beginning of the opening of the cowl.

13. A device according to claim 9, further comprising a device for limiting a speed of the cowls at a beginning of the opening of the cowl.

* * * * *